(12) United States Patent
Mecl et al.

(10) Patent No.: US 12,510,424 B2
(45) Date of Patent: Dec. 30, 2025

(54) FIBER OPTIC TEMPERATURE CONTROL SYSTEM

(71) Applicant: ACCELOVANT TECHNOLOGIES CORPORATION, North Vancouver (CA)

(72) Inventors: Ondrej Mecl, North Vancouver (CA); Noah John Joe Johnson, North Vancouver (CA); James William Wiltshire Garrow, North Vancouver (CA)

(73) Assignee: ACCELOVANT TECHNOLOGIES CORP., North Vancouver (CA)

( * ) Notice: Subject to any disclaimer, the term of this patent is extended or adjusted under 35 U.S.C. 154(b) by 326 days.

(21) Appl. No.: 18/256,876

(22) PCT Filed: Jan. 19, 2022

(86) PCT No.: PCT/CA2022/050069
§ 371 (c)(1),
(2) Date: Jun. 9, 2023

(87) PCT Pub. No.: WO2022/155732
PCT Pub. Date: Jul. 28, 2022

(65) Prior Publication Data
US 2024/0019319 A1 Jan. 18, 2024

Related U.S. Application Data

(60) Provisional application No. 63/139,483, filed on Jan. 20, 2021.

(51) Int. Cl.
*G01K 11/3213* (2021.01)
*G05D 23/275* (2006.01)

(52) U.S. Cl.
CPC ... *G01K 11/3213* (2013.01); *G05D 23/27535* (2013.01)

(58) Field of Classification Search
CPC .......................... G01K 11/3213; G01J 5/0821
See application file for complete search history.

(56) References Cited

U.S. PATENT DOCUMENTS

| 5,808,730 A | 9/1998 | Danielian et al. |
| 6,283,632 B1 * | 9/2001 | Takaki ................... G01K 11/18 374/161 |

(Continued)

OTHER PUBLICATIONS

International Search Report in International Application No. PCT/CA2022/050069 issued Apr. 8, 2022.

(Continued)

*Primary Examiner* — Mirellys Jagan

(57) ABSTRACT

Examples of a fiber optic temperature control system is provided. The fiber optic temperature control system comprises two or more independent temperature measuring system combined into single fiber optic probe. The fiber optic temperature control system comprises at least one temperature control measuring system and an overtemperature measuring protection system. The least one temperature control measuring system comprises a first temperature controller, a first opto-electronic converter with a first light source, a first detector and a first processor, and a first fiber optic bundle with a plurality of optical fibers to provide temperature measurement from at least one point. The over temperature measuring protection system comprises a second controller, a second opto-electronic convertor with a second detector and second processor, and a second fiber optic bundle with a plurality of optical fibers. A splitter coupled to the first and the second fiber optic bundles to physically separate the first and the second fiber optic bundles into a first and a second independent optical guiding (Continued)

channels enclosed by the single probe. A thermographic phosphor is provided at a distal end of the probe so that at least two independent temperature measurements are provided using a single fiber optic temperature sensing probe.

11 Claims, 3 Drawing Sheets

(56) References Cited

U.S. PATENT DOCUMENTS

| | | | |
|---|---|---|---|
| 6,881,948 B2 | 4/2005 | Dammann | |
| 7,377,689 B2 | 5/2008 | Balan | |
| 8,337,079 B2 * | 12/2012 | Kinugasa | G01K 11/20 |
| | | | 374/161 |
| 10,793,772 B1 * | 10/2020 | Johnson | C09K 11/02 |
| 2009/0261751 A1 * | 10/2009 | Kinugasa | G01K 11/3213 |
| | | | 315/293 |
| 2023/0066887 A1 | 3/2023 | Ichihashi et al. | |

OTHER PUBLICATIONS

Written opinion on Patentability of International Application No. PCT/CA2022/050069 issued Apr. 8, 2022.
Grattan, K.T.V. et al., A Fibreoptic Temperature Sensor Using Fluorescent Decay, SPIE vol. 492 ECOOSA '84, Amsterdam 1984 / 535.
Wickersheim, Kenneth A; Sun, Mei H., Fiberoptic Thermometry and Its Applications, Journal of Microwave Power and Electromagnetic Energy, 1987, 22:2, 85-94, DOI: 10.1080/08327823.1987.11688010.

* cited by examiner

FIBER OPTIC TEMPERATURE CONTROL SYSTEM

TECHNICAL FIELD

The present disclosure generally relates to a fiber optic temperature control system and more particularly a fiberoptic temperature control system with two separate measurements channels integrated in a single probe.

BACKGROUND

Unless otherwise indicated herein, the materials described in this section are not prior art to the claims in this application and are not admitted to be prior art by inclusion in this section.

Temperature control systems commonly known use two separate thermocouple measurement system. One system that includes a measuring sensor and electronic channel is used for a temperature control loop and the second system that includes separate sensor and electronics is used for overtemperature protection loop.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure. Sizes and relative positions of elements in the drawings are not necessarily drawn to scale. For example, the shapes of various elements and angles are not drawn to scale, and some of these elements are arbitrarily enlarged and positioned to improve drawing legibility.

DETAILED DESCRIPTION OF SPECIFIC EMBODIMENTS

The present invention discloses a fiber optic temperature control system that comprises two or more independent fiber optic temperature measuring systems combined into single fiber optic probe. A thermographic phosphor is provided at distal ends of the probes so that at least two independent temperature measurements are provided. In some implementations the two independent fiber optic temperature measuring systems are combined into a single fiber optic probe simplifying the system while still providing two independent measurements as required by the safety standards (i.e., IEC 60730-1—Automatic electrical controls Part 1: General requirements).

Figure 1:
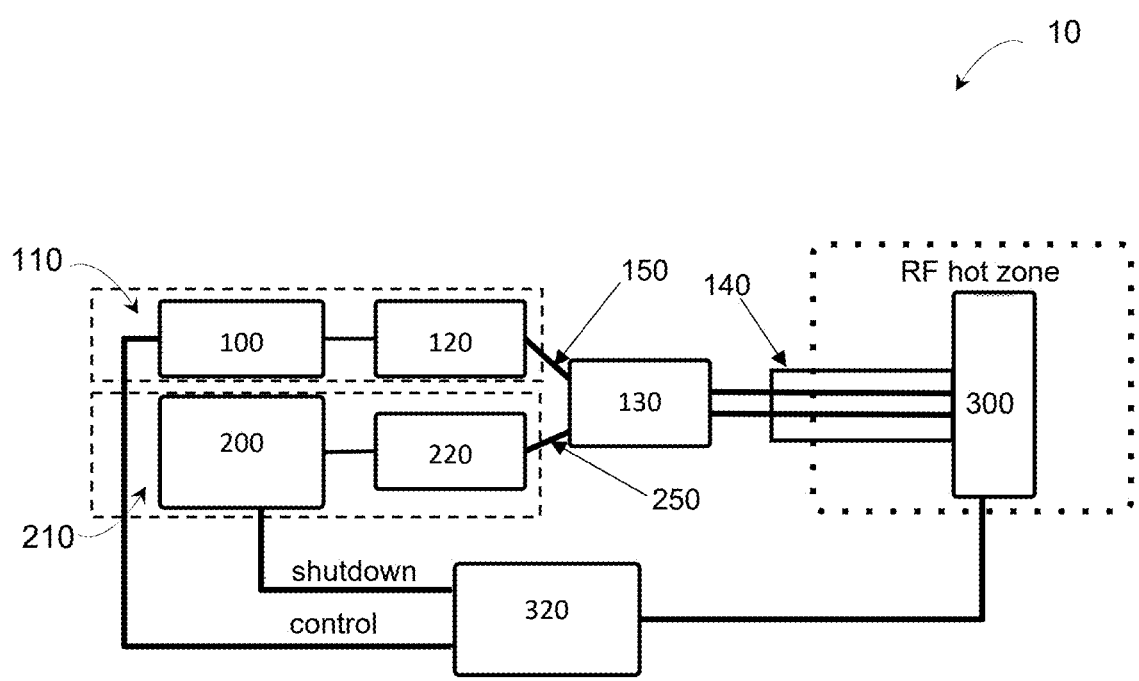
FIG. 1 is a schematic view of an example of a fiber optic temperature control system according to an embodiment of the present invention with two separate measurement channels integrated in a single probe.
Figure 2:
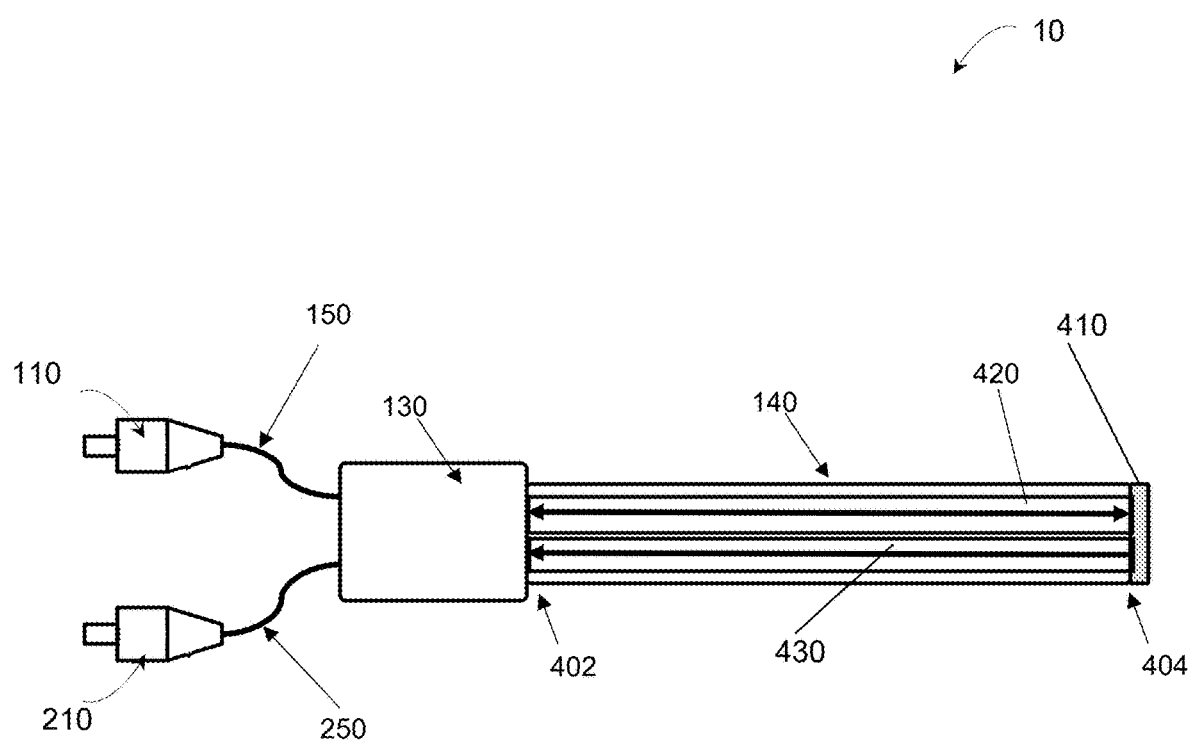
FIG. 2 is a schematic view of an example of a fiber optic temperature control system showing two separate measurement channels integrated in a single probe.

FIG. 1 illustrates an example of a fiber optic temperature control system 10 that comprises at least one temperature control measuring system 110 and at least one overtemperature measuring protection system 210. The least one temperature control measuring system 110 comprises a first temperature controller 100 and a first opto-electronic converter 120. The first opto-electronic converter 120 includes a first light source, a first detector and a first processing unit. The first light source can provide excitation light to a sensor 410 (see FIG. 2) that comprises an active sensing material. For example, the light source can be a laser or a LED that can provide an excitation light in the UV waveband range between 200-400 nm or in the blue to green wavelength range (e.g., 400-600 nm). The sensor 410 can be a thermographic phosphor. When the thermographic phosphor is illuminated with the excitation light it will emit fluorescence light in the red wavelength range of 600-800 nm. The response of the emitted light to temperature is monitored by various methods, such as analyzing the change in emission intensity at a single wavelength range or the change in intensity ratio of two or more wavelength ranges, lifetime decay, or shift in emission wavelength peak. A driver (not shown) can also be provided to trigger the first light source. The first detector is configured to receive the light emitted from the sensing active material 410. For example, the first detector can be a photodiode that can convert the optical signal (emitted light) into an analog electrical signal. The photons absorbed by the photodetector (e.g., photodiode) generate an electrical current. The electrical signal can be intensified using an amplifier and then the analog electrical signal can be digitized using an A/D converter. The processing unit is configured to process the signals detected from the detector and determines the measured temperature. The first opto-electronic converter 120 converts the analog signal into a digital electrical signal and feeds a temperature signal to the first temperature controller 100 that controls temperature of a heater 300 by sending a control signal to a heater controller 320. The at least one temperature control measuring system 110 further comprises a first fiber optic bundle 150 with a plurality of optical fibers coupled to the first opto-electronics converter 120 to transmit the excitation and the emitted light.

The at least one overtemperature measuring protection system 210 comprises a second temperature controller 200 and a second opto-electronic convertor 220 (similar to the opto-electronic convertor 120). The second temperature controller 200 is an overtemperature protection controller that is in communication with the heater controller 320 and sends a shutdown signal to the heater controller 320 when the temperature of the heater 300 reaches a predetermined level. The second opto-electronic convertor 220 comprises a second detector and a second processing unit. The second temperature controller 200 can be passive controller and may not comprise any light source to provide excitation light to the sensing material 410. The second detector can also be a photodiode similar to the first detector. The at least one overtemperature measuring protection system 210 can further comprise a second fiber optic bundle 250 with a plurality of optical fibers to transmit the emitted light back to the second opto-electronic convertor 220. A splitter 130 is coupled to the first and the second fiber optic bundles 150, 250 to physically separate the first and the second fiber optic bundles 150, 250 into a first guiding channel 420 and a second guiding channel 430 (see FIG. 2). The first and the second guiding channels are independent optical guiding channels that are enclosed by a single probe 140. The single probe 140 have a first (proximal) end 402 coupled to the splitter 130 and a second (distal) end 404.

The sensor 410 (i.e., thermographic phosphor) is provided at the distal end 404 of the probe 140 so that at least two independent temperature measurements are provided using a single fiber optic temperature sensing probe 140 and a single sensor 410. The thermographic phosphor can be bounded together using a binding material, such as silicone or epoxy, to secure the phosphor at the second end 404 of the fiber optic probe 140. In one implementation, the sensing active material 410 can be monolithic ceramic metal oxide phosphor composite described in a co-pending U.S. Pat. No. 10,793,772 incorporated here by reference. The phosphor can be any thermographic phosphor. The thermographic phosphor can be selected from a group of Manganese doped $Mg_4FGeO_6$:Mn and all possible stoichiometry within this class, Europium doped $La_2O_2S$:Eu, Europium doped $Y_2O_3$:Eu, Europium doped $LuPO_4$:Eu, Dysprosium doped $YVO_4$:Dy, Dysprosium doped $Y_2O_3$:Dy, Dysprosium doped $LuPO_4$:Dy, Dysprosium doped Yttrium aluminium garnet YAG:Dy and any combination thereof.

The fiber optic temperature control system 10 can be used for temperature control of the heater 300 that is controlled by the heater controller 320. The heater 300 can comprise a heating element, a power source that powers the heating element and a driver that turns on and off the heater power source. The heater control 320 is in communication with the heater's power source driver and with the at least one temperature control measuring system 110 and the at least one overtemperature measuring protection system 210.

The light source of the least one temperature control measuring system 110 is aligned with the first fiber optic bundle 150 so that the excitation light enters therein and is transmitted to the active material 410 by the first guiding channel 420. The first detector of the least one temperature control measuring system 110 is also aligned with the first fiber optic bundle 150, so that the light emitted from the active material 410 is transmitted the first guiding channel 420 and the first fiber optic bundle 150 back to the first detector. The first fiber optic bundles 150 in the guiding channel 420 can have a number of optical fibers to transmit the excitation light to the sensor 410 and the emitted light to the first detector. For example, the first fiber optic bundle 150 can comprise 300 fibers each 50 µm diameter, however the number of the fibers in the bundle 150 can be more or less than 300 without departing from the scope of the invention. The first fiber bundle 150 can transmit both the excitation and the emitted light (no separate excitation and the emitted light guides) or one portion of the fiber bundle 150 can be used as a path to deliver excitation light to the sensor 410 while a second portion of the fiber bundle 150 can be used to guide the emitted light back to the first detector. For example, a fiber bundle splitter (same or separate from the splitter 130) can be used to split the fiber bundle 150 into two separate fiber bundles fitted into the first guiding channel 420. A number of optical splitters and/or focusing lens can also be used to separate excitation light and the emitted light. The second detector of the at least one overtemperature measuring protection system 210 is aligned with the second fiber optic bundle 250 and the second guiding channel 430, so that the second detector can detect (observe) the light emitted from the sensor 410.

Persons skilled in the art would understand that the fiber optic temperature control system 10 can comprise two or more temperature control measuring system 110 and two or more overtemperature measuring protection system 210 to provide multi point measurements without departing from the scope of invention.

In one mode of operation, the light source from the at least one temperature control measuring system 110 illuminates the sensor 410 and based on the detected emitted light determines the temperature of the heater 300. When the measured temperature of the heater 300 reaches a predetermined temperature level (range), the controller 100 sends periodically ON/OFF signals to the heater controller 320 to stabilize the temperature (e.g., process temperature) typically using Proportional-Integral-Derivative (PID) control loop algorithms. The second detector also detects the emitted light from the sensor 410 and the at least one overtemperature measuring protection system 210 determines the temperature of the heater 300. If the temperature is above a certain pre-determined "trip" value, the system 210 (e.g., the second controller 200) send the shutdown signal to the heater controller 320 to turn off the power source of the heater 300. In case of failure of the at least one temperature control measuring system 110, the at least one overtemperature measuring protection system 210 is not able to determine the temperature for shutdown purposes and therefore determines failure of the system 110 and sends a signal to the heater control 320 to turn off the heater 300 based on fault detection of system 110. For example, the second controller 200 of the at least one overtemperature measuring protection system 210 can detect a "HIGH" failure mode of the at least one temperature control measuring system 110, such as for example, when the light source of the least one temperature control measuring system 110 is permanently ON and blinding the first and second detector of both systems 110, 210, then the second controller 200 will send a signal to the heater controller 320 to turn off the heater 300. In the case when the least one temperature control measuring system 110 fails "LOW", such as when the second detector does not detect any light emitted from the sensor 410, then the second controller 200 of the at least one overtemperature measuring protection system 210 will send signal to the heater controller 320 to turn off the heater 300.

Figure 3:
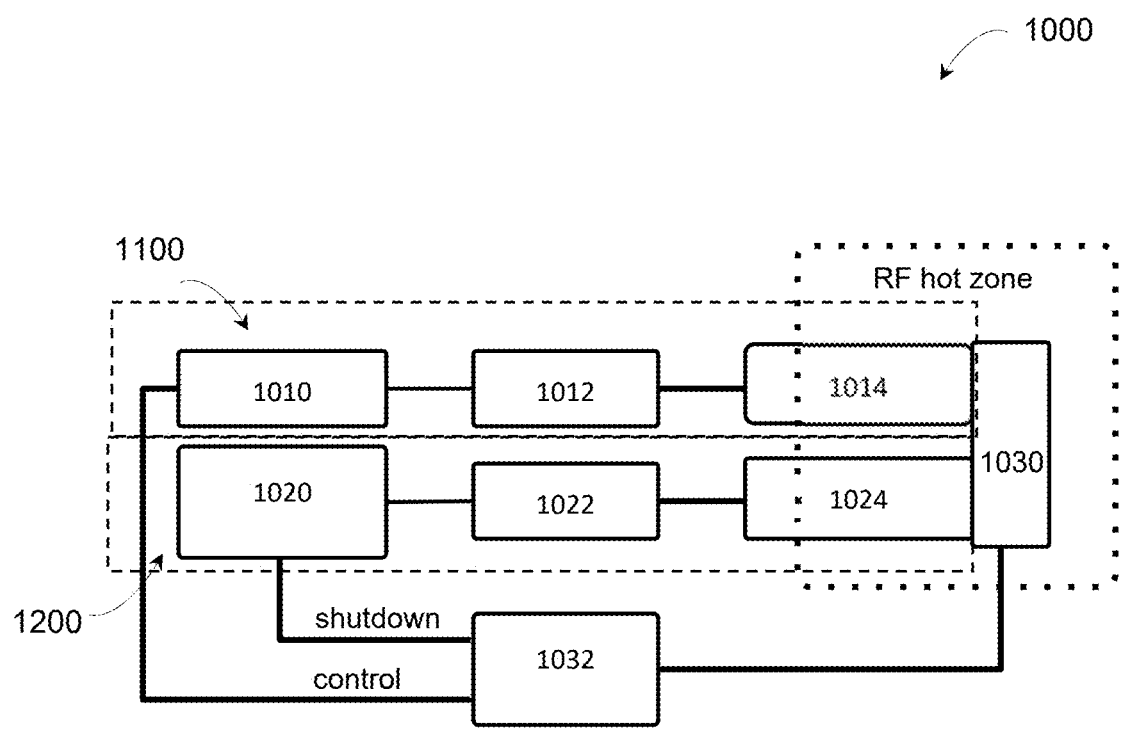
FIG. 3 is a schematic view of another example of a fiber optic temperature control system with two independent fiber optic temperature measuring systems.

FIG. 3 schematically illustrates another embodiment of a temperature control system 1000 with two separate measurement systems, such as a temperature control system 1100, and an overtemperature protection system 1200. The temperature control system 1100 comprises a first temperature controller 1010, a first opto-electronic convertor 1012 and a first fiber optic probe 1014. The first opto-electronic convertor 1012 can comprise a first light source to provide illumination light to the first fiber optic probe 1014, a first detector to detect the emitted light and a first processing unit to process the emitted light and determines a temperature of the heater 1030. The fiber optic probe 1014 is configured to guide the illumination light to a measuring object, such as for example the heater 1030, and guide the light emitted from the heater 1030 back to the first detector. At the end of the fiber optic probe, there is the active sensing material, such as for example thermographic phosphor. It is well known that thermographic phosphors when excited with light within a certain wavelength range, emit a light within a different wavelength range with characteristics that change with temperature. The response of the emitted light to temperature is monitored by, for example, analyzing the change in emission intensity at a single wavelength range or the change in intensity ratio of two or more wavelength ranges, lifetime decay, or shift in emission wavelength peak. Phosphor used for measuring the temperature of an object is either coated directly on the surface of the object or placed at a tip of the probe and brought in contact with the surface of the object, which is then illuminated with a light source and the temperature of the object is determined based on the response of the emitted light. Thus, that the temperature of the heater 1030 can be determined based of the emitted light received by the temperature controller 1010. The overtemperature protection system 1200 is separate and independent measuring system that also comprises a second overtemperature protection controller 1020; a second opto-electronic convertor 1022 with a separate second light source, a second detector and a second processing unit; and a second fiber optic probe 1024. The temperature controller system 1000 further can comprise a heater controller 1032 that is in communication with the power source of the heater 1030 and the first temperature controller 1010 and the overtemperature protection controller 1020. In this embodiment, the fiber optic temperature control system 1000 has two independent temperature measuring systems with two independent probes 1014, 1024 and provide two independent temperature measurements. Each probe 1014, 1024 can have a separate sensor (e.g., thermographic phosphor) coupled to the distal end of the respective probe 1014, 1024. When the heater 1030 reaches the predetermined temperature the overtemperature protection system 1200 sends a signal to the heater controller 1032 to turn off the heater 1030. The temperature controller system 1100 independently measures the temperature of the heater 1030 and if the overtemperature protection system 1200 fails to turn off the heater at the predetermined temperature, it can send a signal to the heater controller 1032 to turn off the heater 1030.

While particular elements, embodiments and applications of the present disclosure have been shown and described, it will be understood, that the scope of the disclosure is not limited thereto, since modifications can be made by those skilled in the art without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and sub-combinations are intended to fall within the scope of this disclosure. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The example calculations, simulations, results, graphs, values, and parameters of the embodiments described herein are intended to illustrate and not to limit the disclosed embodiments. Other embodiments can be configured and/or operated differently than the illustrative examples described herein.

The invention claimed is:

1. A fiber optic temperature control system comprising:
    a temperature measuring control system comprising:
        a first temperature controller;
        a first opto-electronic converter that includes a first light source, a first detector and a first processing unit; and
        a first fiber optic bundle with a plurality of optical fibers;
    an overtemperature measuring protection system comprising:
        a second temperature controller;
        a second opto-electronic convertor that includes a second detector and a second processing unit; and
        a second fiber optic bundle with a plurality of optical fibers;
    at least one fiber optic probe having a first end in communication with the temperature measuring control system and the overtemperature measuring protection system, a second end, and an elongated body extending between the first end and the second end;
    a heater having a power source and a driver to activate the heater;
    a heater controller in communication with the driver of the heater the temperature measuring control system and the overtemperature measuring protection system; and
    a sensor coupled to the second end of the at least one fiber optic probe and in operation being in close proximity to the heater, the first light source of the temperature control system providing excitation light to the sensor, and light emitted from the sensor being transmitted to the first detector and to the second detector;
    wherein the heater controller receives a control signal from the first temperature controller to stabilize a heater temperature at a predetermined range and wherein the heater controller receives a shutdown signal from the overtemperature protection system when it detects a failure of the temperature measuring control system and/or when the heater temperature is above the predetermined range to turn off the heater.

2. The fiber optic temperature control system of claim 1, wherein the sensor is a thermographic phosphor bounded together using a binding material to secure the phosphor at the second end of the at least one fiber optic probe.

3. The fiber optic temperature control system of claim 1, wherein the sensor is a monolithic thermographic phosphor embedded into a notch formed in proximity to the second end of the at least one fiber optic probe.

4. The fiber optic temperature control system of claim 1, wherein the failure of the temperature measuring control system is one of a high failure mode or a low failure mode.

5. The fiber optic temperature control system of claim 1 further comprising a splitter coupled to the first and the second fiber optic bundles to physically separate the first and the second fiber optic bundles into a first and a second independent optical guiding channels.

6. The fiber optic temperature control system of claim 5, wherein the at least one fiber optic probe is a single fiber optic probe, and wherein the first end of the single fiber optic probe is coupled to the splitter, the elongated body of the single fiber optic probe enclosing the first and the second independent guiding channels.

7. The fiber optic temperature control system of claim 5, wherein the first light source provides excitation light to the sensor through the first optical guiding channel, and the light emitted from the sensor is transmitted to the first detector through the first optical guiding channel and to the second detector through the second optical guiding channel.

8. The fiber optic temperature control system of claim 5, wherein the overtemperature measuring protection system is passive without any light sources.

9. A fiber optic temperature control system comprising:
a temperature measuring control system comprising:
a first temperature controller;
a first fiber optic probe having a first end, a second end, and an elongated body extending between the first end and the second end; and
a first opto-electronic converter that includes a first light source, a first detector, and a first processing unit;
an overtemperature measuring protection system comprising:
a second overtemperature protection controller;
a second opto-electronic convertor that includes a second light source, a second detector, and a second processing unit; and
a second fiber optic probe,
wherein the overtemperature measuring protection system is an independent temperature measuring system from the temperature measuring control system;
a heater having a power source and a driver to activate the heater;
a heater controller in communication with the driver of the heater, the temperature measuring control system and the overtemperature measuring protection system; and
a sensor coupled to the second end of the first fiber optic probe and, in operation, being in close proximity to the heater, the first light source of the temperature control system providing excitation light to the sensor, light emitted from the sensor being transmitted to the first detector, and the first processing unit processes the emitted light and determining a temperature of the heater;
wherein the heater controller receives a control signal from the first temperature controller to stabilize a heater temperature at a predetermined range, and wherein the heater controller receives a shutdown signal from the overtemperature protection system when it detects a failure of the temperature measuring control system and/or when the heater temperature is above the predetermined range to turn off the heater.

10. The fiber optic temperature control system of claim 9, wherein the second fiber optic probe is configured to guide the excitation light from the second light source to the sensor and guide the light emitted from the sensor back to the second detector, wherein when the heater reaches the predetermined range the overtemperature measuring protection system sends a signal to the heater controller to turn off the heater, and wherein the temperature controller system independently measures the temperature of the heater and if the overtemperature measuring protection system fails to turn off the heater at the predetermined range it sends a signal to the heater controller to turn off the heater.

11. The fiber optic temperature control system of claim 9, further comprising a second sensor coupled to a distal end of the second fiber optic probe and, in operation, being in close proximity to the heater.

* * * * *